United States Patent [19]
Shields et al.

[11] Patent Number: 5,320,668
[45] Date of Patent: Jun. 14, 1994

[54] BLEED ALLEVIATION USING PH-SENSITIVE AGENTS

[75] Inventors: James P. Shields; Raymond J. Adamic, both of Corvallis, Oreg.

[73] Assignee: Hewlett-Packard Company, Palo Alto, Calif.

[21] Appl. No.: 6,080

[22] Filed: Jan. 19, 1993

Related U.S. Application Data

[63] Continuation-in-part of Ser. No. 764,014, Sep. 23, 1991, Pat. No. 5,181,045.

[51] Int. Cl.⁵ ............................................. C09D 11/02
[52] U.S. Cl. ................................. 106/20 R; 106/23 R
[58] Field of Search ........................... 106/20 R, 23 R

[56] References Cited

U.S. PATENT DOCUMENTS

| | | | |
|---|---|---|---|
| 4,963,189 | 10/1990 | Hindagolla | 106/22 K |
| 5,106,416 | 4/1992 | Moffatt et al. | 106/23 R |
| 5,160,372 | 11/1992 | Matrick | 106/19 R |
| 5,181,045 | 1/1993 | Shields et al. | 106/22 D |
| 5,196,056 | 3/1993 | Prasad | 106/20 R |

*Primary Examiner*—Helene Klemanski

[57] ABSTRACT

Certain colorants become insoluble under specific and well-defined pH conditions. By forcing a colorant to become insoluble on the page, migration of the colorant is inhibited, thereby helping to reduce bleed between inks of different colors. The colorant is forced out of solution from the ink by contact with another ink having the appropriate pH (either higher or lower than that of the first ink). In particular, an ink containing a colorant comprising a pigment in combination with a pH sensitive dispersant is used in conjunction with an ink of the appropriate pH.

19 Claims, 2 Drawing Sheets

BLEED ALLEVIATION USING PH-SENSITIVE AGENTS

CROSS-REFERENCE TO RELATED APPLICATION

This application is a continuation-in-part of application Ser. No. 07/764,014, filed Sep. 23, 1991 now U.S. Pat. No. 5,181,045.

TECHNICAL FIELD

The present invention relates to inks employed in ink-jet printing, especially in thermal ink-jet printing, and, more particularly, to colored and black ink compositions in which color bleed is substantially reduced or even eliminated.

BACKGROUND ART

Thermal ink-jet printers offer a low cost, high quality, and comparatively noise free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area fill, and provides other print capabilities on the medium.

Many thermal ink-jet inks, when printed in various colors on bond paper, copier paper, and other media, can lead to bleed. The term "bleed", as used herein, is defined as follows: When inks of two different colors are printed next to each other, it is desired that the border between the two colors be clean and free from the invasion of one color into the other. When one color does invade into the other, the border between the two colors becomes ragged, and this is bleed.

This is in contradistinction to uses of the term in the prior art, which often defines "bleed" in the context of ink of a single color following the fibers of the paper.

Prior solutions to bleed have largely involved the use of heated platens or other heat sources and/or special paper. Heated platens add cost and complexity to the printer. Special paper limits the user to a small, select group of papers that are more expensive than a "plain" paper.

A need remains for ink compositions for use in ink-jet printing, particularly thermal ink-jet printing, which do not evidence bleed, as defined herein, when printed on plain papers and without the use of heaters, and yet which possess relatively long shelf life and other desirable properties of such inks.

DISCLOSURE OF INVENTION

In accordance with the invention, certain colorants which include both dye and pigment based inks are used which become insoluble under specific and well defined pH conditions. By forcing the colorants to become insoluble on the page, migration of the colorant is inhibited, thereby helping to reduce bleed between different colors. Rendering the colorant insoluble is achieved by making the colorant come out of solution or to precipitate; this is done by contacting the ink containing the pH-sensitive colorant with another ink having an appropriate pH.

BEST MODES FOR CARRYING OUT THE INVENTION

Figure 1:
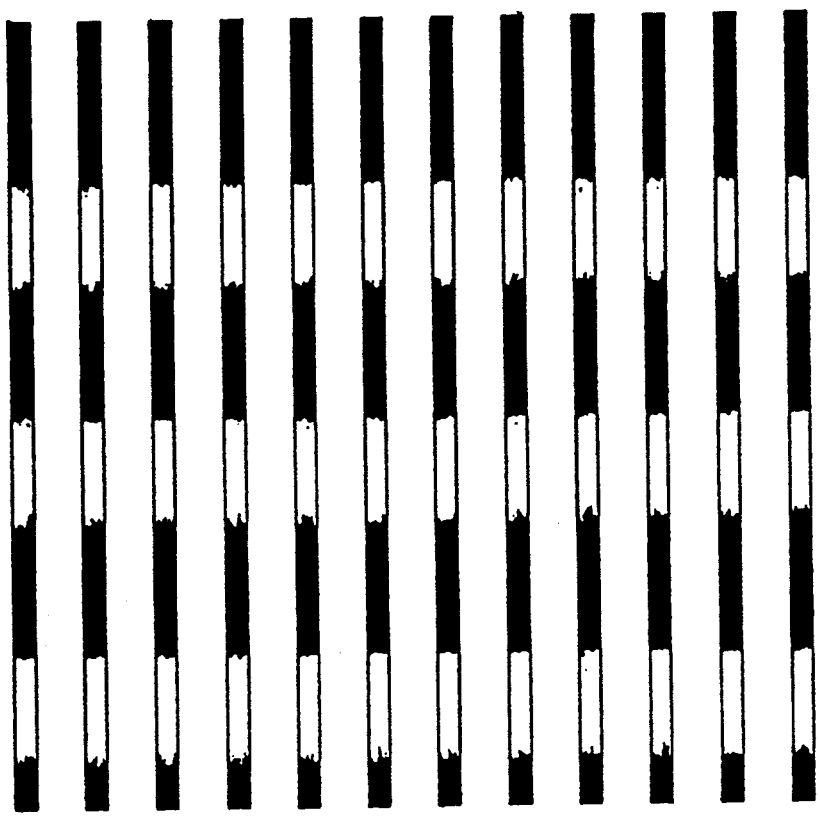
FIG. 1 is a line drawing representative of printing two colors evidencing bleed.

It is known that certain colorant classes, i.e., dyes and dispersed pigments, become insoluble under specific and well-defined pH conditions. Examples of such dyes are carboxylated dyes, such as azo dyes, xanthene dyes, copper phthalocyanine dyes, and the like. Other dyes exhibiting differential solubility with pH are also useful in the practice of the invention. Examples of such pigments employed in conjunction with dispersants having pH-sensitive functional groups include the carbon blacks, such as carbon black FW18 (available from DeGussa Corp., Ridgefield, N.J.), Pigment Black 7, Pigment Blue 15, Pigment Red 2, and Disperse Red 17 and other pigments listed in *Color Index*, Vol. 4, 3rd ed., published by the Society of Dyers and Colourists, Yorkshire, England, 1971. Other pigment dispersions exhibiting differential solubility with pH are also useful in the practice of the present invention.

Water-based pigment inks consist of a pigment material that is essentially insoluble. This pigment is rendered effectively soluble through the use of a dispersant. This dispersant has a hydrophobic portion and a hydrophilic portion. The hydrophobic portion is associated with the pigment particle while the hydrophilic portion brings about the water solubility.

In accordance with the invention, pH-sensitive dispersants are employed. In such dispersants, functional groups on the hydrophilic portion of the dispersant are pH-sensitive; examples of such pH-sensitive functional groups include carboxylate groups. Other pH-sensitive groups may also be used in the practice of the invention.

These carboxylated dispersants will behave much the same as the carboxylated dyes with respect to their pH dependant solubility. As the pH is lowered and the carboxylate groups become protonated, the solubility of the pigment dispersion decreases. At some point, the pigment dispersion will begin to become unstable and the dispersed pigment will effectively drop out of solution. Typical dispersants would include those having at least one and preferably multiple carboxyl groups which basically consist of acrylic monomers and polymers known in the art. An example of such a dispersant includes a product sold by W. R. Grace and Co. of Lexington, Mass., under the trademark, DAXAD 30-30.

Without subscribing to any particular theory, Applicants believe that by forcing a colorant to become insoluble on the page, then migration of the colorant will be inhibited, thereby helping to reduce bleed between different colors. The "force" used to make the colorant come out of solution or to precipitate is to contact the colorant with another ink having an appropriate pH.

An example of an ink that contains such a dye has a formulation given by:
- about 7.5 wt % 2-pyrrolidone,
- about 0.1 wt % $(NH_4)_2HPO_4$,
- about 2 wt % of a carboxylated azo dye,
- and the balance water.

The dye in this ink is known to come out of solution as the pH drops down to about 6.5 to 7.0. If dots of another ink, having a relatively low pH, say about 4.0, are laid down next to dots of the first ink, then the dye from the first ink will fall out of solution (precipitate). The belief at this point is that this will slow down the migration of the dye and therefore help to reduce bleed between the two inks.

An example of an ink that contains such a pigment dispersion is a black ink which has a formulation broadly given by:
 (a) about 1 to 30 wt % solvent,
 (b) about 0 to 15 wt % co-solvent,
 (c) about 0.5 to 7 wt % carbon black,
 (d) about 0.25 to 3.5 wt % dispersant,
 (e) the balance water,
 (f) pH of about 8 to 10.

Examples of solvents suitably employed in the practice of the invention include glycols such as ethylene glycol, diethylene glycol, triethylene glycol, tetraethylene glycol, propylene glycol, polyethylene glycol, polypropylene glycol, hydroxypivalyl hydroxypivalate and derivatives thereof; diols such as butanediol, pentanediol, hexanediol, and homologous diols; glycol esters such as propylene glycol laurate; mono and di glycol ethers such as cellosolves, including ethylene glycol monobutyl ether, diethylene glycol ethers such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as $\gamma$-butyrolactone, lactams such as 2-pyrrolidone, 1-methyl-2-pyrrolidone, and 1-(2-hydroxyethyl)-2-pyrrolidone, and glycerols and their derivatives and mixtures thereof.

Examples of co-solvents include ethoxylated glycerins, ethylene glycol, diethylene glycol, and 2-pyrrolidone. These co-solvents may be added to enhance print quality by sharpening edge acuity and darkening the print and to aid pen functionality by reducing nozzle clogging.

It is possible that the solvent and co-solvent are the same compound, as in the case of diethylene glycol. Such is permissible, so long as the compound falls within the ranges of both the solvent and the co-solvent.

A preferred specific example of the foregoing ink comprises:
- about 5 wt % hydroxypivalyl hydroxypivalate,
- about 5 wt % ethoxylated glycerin,
- about 3.5 wt % carbon black FW18,
- about 1.75 wt % of the dispersant,
- the balance water.

The pH is preferably about 8.5.

The pigment dispersion in this ink is known to come out of solution as the pH drops down to about 6.5 to 7.0.

The second ink used in the practice of the invention contains a water-soluble dye in water; other solvents, such as those selected from the list of solvents above, may also be added. Any of the well-known water-soluble dyes may be employed. The pH of the second ink ranges from about 3.6 to 5.6.

The pH effect employed in the practice of the present invention is not to be confused with the use of pH changes on paper which lead to improved waterfastness. First, waterfastness issues involve the ability of the ink to resist smearing when water is dripped across a printed line of ink, while bleed resistance is the ability of the ink to resist mixing of one color with another when both are printed in close succession. Having solved one problem does not imply a solution to the other.

Solving waterfastness in other systems has involved the use of a single ink. This is in contrast to the present invention in which a second ink is used to bring about the desired effect, i.e., reduction of bleed.

In addition, the present invention involves what is essentially a border effect, i.e., the drastic pH conditions of the two inks in question bring about the desired effect at the border of the two inks. This differs with the mode in which other dye-based inks achieve waterfastness, i.e., an entire dot of black ink is subjected to paper which lowers the pH slightly and brings about insolubility (and thus waterfastness); see, e.g., U.S. Pat. No. 4,963,189.

Finally, it should be mentioned that using a second ink with a pH of, for example, 4 will have a much greater effect on the solubility of the pH-sensitive colorant than will any pH change caused by the paper. Paper-induced pH changes in the ink are small compared to contact with a fluid that is buffered at a pH of 4.

Thus, while it is thought that the pH of the paper itself contributes to an improvement of waterfastness, in the present application, a second ink, having a pH low enough to bring about insolubility of colorant in the first ink, is used to bring about the desired effect, i.e., bleed reduction.

The method of the invention eliminates the requirement of a heater or heated platen in order to reduce bleed from an ink of one color into an ink of another color, and the need for special paper to control bleed between inks that otherwise would bleed on plain types of paper.

While the specific example given is directed to the use of an ink having a lower pH than the first ink, it is also possible to employ an ink having a higher pH than the initial ink. In this case, the pH-sensitive ink would have the property that it precipitates as the pH is increased.

The effect on bleed may be seen at a pH difference of about 1 to 3 units. Further and near complete control of bleed results when the pH difference is further increased, to about 4 to 5 units. However, these values do not preclude the use of a colorant which is more sensitive to pH than those disclosed herein; with more sensitive pH-colorants, near complete control of bleed could result with only a small difference in pH, considerably less than 4 units.

In order to disperse a water-insoluble pigment in a water solution, the pigment must be vigorously mixed with the dispersant. Simple stirring will generally not be sufficient. Equipment known in the art, such as media mills and two-roll mills, can be used to generate the high shear forces that are necessary to help associate the dispersant with the pigment. In this manner, water-insoluble pigments can be effectively rendered soluble or "dispersed" in water solutions.

Thus, typically, the pigment and dispersant would be pre-mixed in, for instance, a two-roll mill. Then, this combination would be added to the other components of the ink in sufficient quantity so as to achieve the desired color properties. In addition, the ratio of pigment to dispersant will be an important consideration in order to achieve a desirable dispersion. The desired ratio is very system-dependent and can be readily determined by experimentation.

EXAMPLES

Example 1

Vertical bars of black ink intermixed with yellow ink were printed. The black ink comprised 0.2% BORAX buffer, 7.5% 2-pyrrolidone, 0.1% $(NH_4)_2HPO_4$, about 2% of a carboxylated azo dye, and the balance water; the pH of this black ink was 9.0. The yellow ink comprised 5.5% DEG, about 2% Direct Yellow 86 dye, and the balance water; the pH of this yellow ink was 7.9.

Printing was done using a conventional DeskJet ® printer (DeskJet is a trademark of Hewlett-Packard Company); since this is a one-pen printer, the pens containing the two inks were quickly swapped at the appropriate time during printing. The swap took about 3 seconds per color change. As can be seen in FIG. 1, extensive bleed of the black ink into the yellow ink occurred. FIG. 1 is a line drawing of the actual result obtained.

Example 2

In this example, the yellow ink of Example 1 was adjusted to a pH of 4.6 with HCl and buffered with citric acid. Otherwise, both inks were identical as in Example 1.

Figure 2:
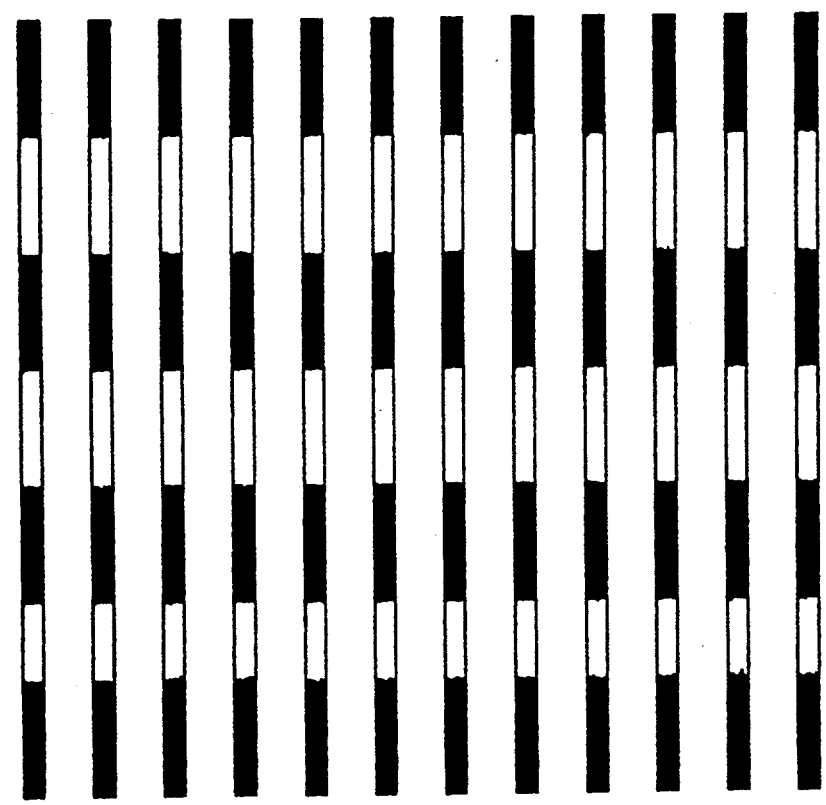
FIG. 2 is a line drawing representative of printing two colors in which bleed has been substantially reduced.

Upon printing as in Example 1, virtually no bleed of the black ink into the yellow ink occurred, as can be seen in FIG. 2. FIG. 2 is a line drawing of the actual result obtained.

Example 3

In this Example, a DeskJet ® printer was modified such that it could carry two pens. One of these pens was a tri-chamber pen and the other was a single-chamber pen. However, there is no reason why both pen positions could not be occupied by tri-chamber pens or both by single-chamber pens. However, for this implementation, a pen of each type was used in the two pen positions.

In addition, there is no reason why the tri-chamber pen can not be filled with any combination of inks varying in color or formulation. Further, one or more chambers could be filled with a fluid that does not contain a colorant. In other words, a chamber could be filled with a "fixer", which could be a solution with a pH appropriate to bring about the desired effect.

In this implementation, all chambers of the tri-chamber pen were filled with the same ink. Furthermore, the inks in the tri-chamber pen were all the same color - yellow. The single chamber pen was filled with a second color: black ink. The results of the printing are depicted in FIGS. 3a–c.

Figure 3A:
FIGS. 3A-C are a line drawing representative of printing two colors, comparing the results of color bleed under different pH conditions.
Figure 3B:
Figure 3C:
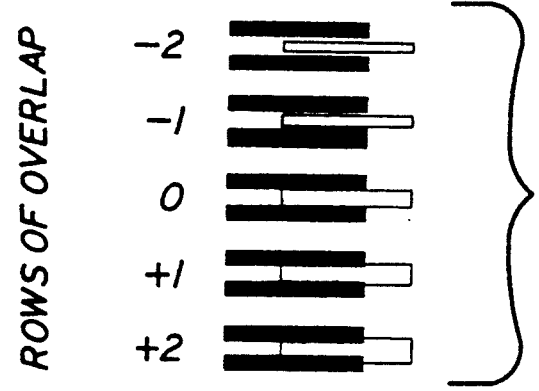

Referring now to FIGS. 3a–c, the yellow ink is represented by the white areas within the lined rectangles and the second color ink by the black areas. The print sample shows one bar of yellow ink printed between two bars of the second color ink. The rows in FIGS. 3a–c represent various amounts of overlap between the black bars and the yellow bars. Thus, in the row marked "−2", there were two blank dot rows between the color and yellow bars. In the row marked "0", there were no blank dot rows between the color and yellow bars. In other words, the color and yellow bars were printed directly adjacent one another. Finally, in the row marked "+2", the color and yellow bars actually overlapped by two dot rows. It would be expected that the bleed between colors would become progressively worse from the top row to the bottom row within a given column.

All yellow ink in FIGS. 3a–c has the following composition:
Diethylene glycol 5.5 wt %
Acid Yellow 23 dye 2 to 4 wt %
Water balance.

These inks were distinguished by the following letter designations, as shown in the Figures:
FIG. 3a: pH adjusted to 5.6; buffered with acetate buffer.
FIG. 3b: pH adjusted to 4.6; buffered with acetate buffer.
FIG. 3c: pH adjusted to 3.6; buffered with acetate buffer.

All black ink in FIGS. 3a–c had the following composition:
HPHP (hydroxypivalyl hydroxypivalate) 5.0 wt %
Ethoxylated glycerin 5.0 wt %
Carbon black FW18 3.5 wt %
pH sensitive dispersant 1.75 wt %.

FIGS. 3a–c show that as the pH of the color ink is successively lowered from 5.6 to 4.6 to 3.6, the bleed control is improved.

INDUSTRIAL APPLICABILITY

The method of reducing bleed is expected to find use in ink-jet printing applications involving two or more colors.

Thus, there has been disclosed a method of reducing bleed in printing at least two different colors on a print medium from an ink-jet pen. It will be readily apparent to those skilled in this art that various changes and modifications may be made without departing from the spirit of the invention, and all such changes and modifications are considered to fall within the scope of the invention as defined by the appended claims.

What is claimed is:

1. A method of reducing bleed in printing at least two different colors on a print medium from an ink-jet pen, comprising printing a first ink containing a dispersed pigment, comprising a pigment in combination with a pH-sensitive dispersant, and printing a second ink having an appropriate pH to cause said dispersed pigment of said first ink to precipitate out on said print medium.

2. The method of claim 1 wherein said second ink has a pH that is lower than that of said first ink.

3. The method of claim 2 wherein said pigment of said first ink is selected from the group consisting of carbon black, Pigment Black 7, Pigment Blue 15, Pigment Red 2, Disperse Red 17.

4. The method of claim 3 wherein said first ink comprises about 1 to 30 wt % solvent, 0 to about 15 wt % cosolvent, about 0.5 to 7 wt % carbon black, about 0.25 to 3.5 wt % dispersant, and the balance water and having a pH of about 8 to 10, and wherein said second ink includes at least one water-soluble dye and water and has a pH of about 3.6 to 5.6.

5. The method of claim 4 wherein said solvent is selected from the group consisting of glycols, diols, glycol esters, glycol ethers, long chain alcohols, esters, ketones, lactones, lactams, and glycerols, and derivatives thereof and mixtures thereof.

6. The method of claim 5 wherein said solvent is selected from the group consisting of ethylene glycol, diethylene glycol, triethylene glycol, tetraethylene glycol, propylene glycol, polyethylene glycol, polypropylene glycol, hydroxypivalyl hydroxypivalate, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols; sulfolane, γ-butyrolactone, 2-pyrrolidone, 1-methyl-2-pyrrolidone, and 1-(2-hydroxyethyl)-2-pyrrolidone, and glycerols and their derivatives.

7. The method of claim 2 where said dispersant has at least one carboxyl group.

8. The method of claim 7 wherein said dispersant has multiple carboxyl groups.

9. The method of claim 2 where said dispersant is selected from the group of acrylic monomers and polymers.

10. The method of claim 4 wherein said first ink comprises about 5 wt % hydroxypivalyl hydroxypivalate, about 5 wt % ethoxylated glycerin, about 3.5 wt % carbon black, about 1.75 wt % dispersant, and the balance water and having a pH of about 8.5, and wherein said second ink comprises 5.5 wt % diethylene glycol, about 2 wt % Acid Yellow 23 dye, and the balance water and having a pH ranging from about 3.6 to less than 5.6.

11. The method of claim 1 wherein said second ink has a pH that is higher than that of said first ink.

12. A thermal ink-jet ink for printing at least two different colors on a print medium from an ink-jet pen, wherein a first ink has the following composition and pH:
(a) about 1 to 30 wt % solvent,
(b) 0 to about 15 wt % co-solvent,
(c) about 0.5 to 7 wt % pigment,
(d) about 0.25 to 3.5 wt % pH-sensitive dispersant,
(e) the balance water,
(f) pH of about 8 to 10,
and wherein a second ink includes at least one water-soluble dye and water and has a pH of about 3.6 to 5.6.

13. The thermal ink-jet ink of claim 12 wherein said pigment of said first ink is selected from the group consisting of carbon black, Pigment Black 7, Pigment Blue 15, Pigment Red 2, Disperse Red 17.

14. The thermal ink-jet ink of claim 13 wherein said solvent is selected from the group consisting of glycols, diols, glycol esters, glycol ethers, long chain alcohols, esters, ketones, lactones, lactams, and glycerols, and derivatives thereof and mixtures thereof.

15. The thermal ink-jet ink of claim 14 wherein said solvent is selected from the group consisting of ethylene glycol, diethylene glycol, triethylene glycol, tetraethylene glycol, propylene glycol, polyethylene glycol, polypropylene glycol, hydroxypivalyl hydroxypivalate, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols; sulfolane, γ-butyrolactone, 2-pyrrolidone, 1-methyl-2-pyrrolidone, and N-(2-hydroxyethyl)-pyrrolidone, and glycerols and their derivatives.

16. The thermal ink-jet ink of claim 12 wherein said first ink has the following composition and pH:
(a) about 5.0 wt % hydroxypivalyl hydroxypivalate,
(b) about 5.0 wt % ethoxylated glycerin,
(c) about 3.5 wt % carbon black,
(d) about 1.75 wt % pH-sensitive dispersant,
(e) the balance water,
(f) pH of 8.5,
and wherein said second ink has the following composition and pH:
(a) about 5.5 wt % diethylene glycol,
(b) about 2 wt % Acid Yellow 23 dye,
(c) the balance water,
(d) pH of about 3.6 to less than 5.6.

17. The ink of claim 12 wherein said pH-sensitive dispersant includes those having at least one carboxyl group.

18. The ink of claim 17 wherein said pH-sensitive dispersant has multiple carboxyl groups.

19. The ink of claim 12 wherein said pH-sensitive dispersant is selected from the group of acrylic monomers and polymers.

* * * * *